(12) United States Patent
Suzuki et al.

(10) Patent No.: US 11,098,208 B2
(45) Date of Patent: Aug. 24, 2021

(54) MULTILAYER LAMINATION FILM FOR LASER PRINTING AND PACKAGE BODY AND PRINTING BODY FORMED THEREBY, AND INK COMPOSITION FOR LASER PRINTING USED THEREFOR

(71) Applicant: Dai Nippon Printing Co., Ltd., Tokyo (JP)

(72) Inventors: Aya Suzuki, Tokyo (JP); Hiroshi Matsuzaki, Tokyo (JP); Katsunobu Ito, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 200 days.

(21) Appl. No.: 16/090,531

(22) PCT Filed: Apr. 3, 2017

(86) PCT No.: PCT/JP2017/013895
§ 371 (c)(1),
(2) Date: Oct. 1, 2018

(87) PCT Pub. No.: WO2017/175698
PCT Pub. Date: Oct. 12, 2017

(65) Prior Publication Data
US 2019/0112492 A1    Apr. 18, 2019

(30) Foreign Application Priority Data
Apr. 4, 2016 (JP) .............................. JP2016-074985

(51) Int. Cl.
*C09D 11/037* (2014.01)
*B41M 5/26* (2006.01)
(Continued)

(52) U.S. Cl.
CPC ............. *C09D 11/037* (2013.01); *B41M 5/26* (2013.01); *B41M 5/267* (2013.01); *B41M 5/283* (2013.01);
(Continued)

(58) Field of Classification Search
CPC ........ B41M 5/26; B41M 5/267; B41M 5/283; B65D 65/40
See application file for complete search history.

(56) References Cited

U.S. PATENT DOCUMENTS

| | | | |
|---|---|---|---|
| 5,855,969 A | | 1/1999 | Robertson |
| 6,191,181 B1 * | | 2/2001 | Weikard ............... C08G 18/672 522/167 |

FOREIGN PATENT DOCUMENTS

| | | |
|---|---|---|
| JP | 2007-055110 | 8/2005 |
| JP | 2007-217048 | 8/2007 |

(Continued)

OTHER PUBLICATIONS

JP2015-143019 Machine Translation of description via EPO.*
(Continued)

*Primary Examiner* — Laura C Powers
(74) *Attorney, Agent, or Firm* — Hamre, Schumann, Mueller & Larson, P.C.

(57) ABSTRACT

Provided is a multilayer lamination film for laser printing that does not require a special ink that discolors by laser light irradiation, and that makes it possible to obtain a printed line having high visibility by irradiation of laser light having a power sufficiently low to avoid damaging a base film. The multilayer lamination film for laser printing includes at least a base material layer, a printing layer, and a sealant layer. The printing layer is a layer made of an ink composition enabling printing by means of laser light. The ink composition is made of white ink containing at least a titanium (Continued)

oxide and a binder resin, the binder resin containing a crystalline component.

8 Claims, 3 Drawing Sheets

(51) Int. Cl.
    *B65D 65/40*     (2006.01)
    *B41M 5/28*     (2006.01)
    *C09D 11/102*     (2014.01)
    *B41M 5/30*     (2006.01)

(52) U.S. Cl.
    CPC ............ *B65D 65/40* (2013.01); *C09D 11/102* (2013.01); *B32B 2307/402* (2013.01); *B32B 2307/4026* (2013.01); *B41M 5/30* (2013.01)

(56) References Cited

FOREIGN PATENT DOCUMENTS

| | | |
|---|---|---|
| JP | 2009-166274 | 7/2009 |
| JP | 2010-047681 | 3/2010 |
| JP | 2010-536970 | 12/2010 |
| JP | 2011-126142 | 6/2011 |
| JP | 2012-131885 | 7/2012 |
| JP | 2015-066723 | 4/2015 |
| JP | 2015-143019 | 8/2015 |
| WO | 2004/046244 | 6/2004 |

OTHER PUBLICATIONS

JP 2015-143019 Machine Translation via EPO.*
JP 2012-131885 Machine Translation via EPO.*
JP 2015-066723 Machine Translation via EPO.*

* cited by examiner

MULTILAYER LAMINATION FILM FOR LASER PRINTING AND PACKAGE BODY AND PRINTING BODY FORMED THEREBY, AND INK COMPOSITION FOR LASER PRINTING USED THEREFOR

TECHNICAL FIELD

The present invention relates to a multilayer lamination film for laser printing that can be printed by a laser, and a package body and printing body that are formed by it, as well as to an ink composition for laser printing to be used for them.

BACKGROUND ART

Printing onto films with laser light from YAG lasers and $YVO_4$ lasers is known in the prior art. Furthermore, multilayer lamination films for laser printing that can be printed by such lasers are known, such films employing special inks that undergo discoloration under laser light irradiation, as their interlayers (color forming layers) (PTL 1).

Because such special inks are extremely expensive, it is common to provide the special ink layer only the portions of the base material that are to be printed, but positioning at such locations is difficult and the printing position cannot be easily changed. Another disadvantage is that the printed lines are narrow and difficult to read.

Most common inks, on the other hand, are known to undergo slight discoloration under irradiation with laser light. The use of such common inks as interlayers (color forming layers) is therefore also known (PTL 2).

In such methods, however, the interlayer is gasified by irradiation of powerful laser light, deforming it without breaking the base material, to form the printed sections. In other words, in order to obtain adequate visibility, the laser output must be increased until the interlayer at the laser irradiated sections fully vaporizes across the total thickness in the depthwise direction (the direction from the surface of one side of the film toward the other surface). A resulting problem is that irradiation with powerful laser light often causes holes to be formed in the base film. Another problem is that, since irradiation of powerful laser light is required, the printing speed is reduced.

On the other hand, it is has been found that printed lines are thickened and visibility is increased if the interlayer lamination strength of the multilayer laminated film is weakened to help produce interlayer separation above and below the interlayer, but since the uses of such multilayer laminated films are limited there is a need for a film for laser printing with higher versatility.

CITATION LIST

Patent Literature

[PTL 1] Japanese Unexamined Patent Application Publication No. 2007-55110
[PTL 2] Japanese Unexamined Patent Application Publication No. 2007-217048

SUMMARY OF INVENTION

Technical Problem

In order to solve the problems of the prior art in printing of additional information on packaging materials that are suitable for a wide variety of different purposes, it is an object of the present invention to provide a multilayer lamination film for laser printing that can be easily produced from inexpensive materials, without requiring a special ink for discoloration by laser light irradiation, that allows the printing position to be easily changed, and that can yield printed lines with high visibility by irradiating laser light at a low output level that does not damage the film base, as well as a package body and printing body formed by it and an ink composition for laser printing to be used for them.

Solution to Problem

As a result of much research, the present inventors have found for the first time that white ink including a crystalline component exhibits excellent properties as a printing ink for laser printing, and that by printing it onto a base material layer, it is possible to form highly visible, clear printed images without requiring weakening of the lamination strength between the layers, and without needing to increase the laser light output.

In other words, it has been found that the object stated above can be achieved by a multilayer lamination film for laser printing comprising at least a base material layer, a printing layer and a sealant layer, wherein the printing layer is a layer made of an ink composition that is printable by laser light, the ink composition includes a white ink including at least titanium oxide and a binder resin, and the binder resin includes a crystalline component.

The present invention has the following features.

(1) A multilayer lamination film for laser printing comprising at least a base material layer, a printing layer and a sealant layer, wherein the printing layer is a layer made of an ink composition that is printable by laser light, the ink composition comprises a white ink including at least titanium oxide and a binder resin, and the binder resin includes a crystalline component.

(2) The multilayer lamination film for laser printing according to (1) above, wherein the white ink has at least one endothermic peak in the endothermic curve during temperature increase as measured with a differential scanning calorimeter.

(3) The multilayer lamination film for laser printing according to (2) above, wherein the peak temperature of at least one endothermic peak is in the range of 50 to 165° C.

(4) The multilayer lamination film for laser printing according to any one of (1) to (3) above, wherein the binder resin is a urethane acrylate including a crystalline component.

(5) The multilayer lamination film for laser printing according to any one of (1) to (4) above, wherein the ink composition further includes a coloring ink in addition to the white ink, and the coloring ink includes a coloring material that develops color by irradiation with laser light, and a binder resin.

(6) The multilayer lamination film for laser printing according to (5) above, wherein the coloring material includes a bismuth-based compound.

(7) The multilayer lamination film for laser printing according to (6) above, wherein the bismuth-based compound is one or more compounds selected from the group consisting of bismuth hydroxide, bismuth oxide, bismuth subcarbonate and bismuth nitrate.

(8) The multilayer lamination film for laser printing according to any one of (5) to (7) above, wherein the coloring ink includes one or more compounds selected from the group consisting of metal oxides and complex oxides.

(9) The multilayer lamination film for laser printing according to any one of (5) to (8) above, wherein the coloring ink includes one or more compounds selected from the group consisting of copper-based compounds and molybdenum-based compounds.

(10) The multilayer lamination film for laser printing according to any one of (5) to (9) above, wherein the coloring material includes antimony-doped tin oxide.

(11) A package body comprising the multilayer lamination film for laser printing according to any one of (1) to (10) above.

(12) The package body according to (11) above, which is for retort treatment.

(13) A printing body having a printed image formed by irradiation of the multilayer lamination film for laser printing according to any one of (1) to (10) above or the package body according to (11) or (12) above, with laser light from a YAG laser, $YVO_4$ laser or fiber laser.

(14) An ink composition for laser printing comprising at least titanium oxide and a binder resin including a crystalline component.

Advantageous Effects of Invention

The multilayer lamination film for laser printing of the invention does not require the use of a special ink for laser printing, and white ink commonly used as a ground layer during printing of printed pattern layers for packaging films may be used as an ink composition to form a printing layer that is printable by laser light. It can therefore be produced from inexpensive materials, and there is no need to provide an additional layer for laser printing during the film production steps.

Moreover, because white ink is less expensive than special inks for conventional laser printing, it is possible to also print not only on the printed sections but also over the entire surface or a wide area of the base material, such as the ground layer of a picture-printing layer, for example, according to the original purpose of the white ink. This eliminates the need for positioning during printing, and also allows the printing position to be changed.

In particular, it has been found that when white ink including a crystalline component is irradiated with laser light from the base material layer side, discolored regions tend to form due to carbonization along the boundary between the base material layer and the printing layer, and the color development is clear. Therefore, the film of the invention can form clear printed images without the need for higher laser output and without the need to weaken the lamination strength of the film.

Furthermore, the printing body of the invention has a laser printed image not on the film surface but in the interior, i.e. between the base material layer and the sealant layer. Therefore, the image has excellent abrasion resistance, so that loss by rubbing and the like can be effectively prevented and changes to the additional information can be prevented.

Because of these advantages, the multilayer lamination film for laser printing of the invention can be suitably used for a wide variety of packaging purposes, and even as a packaging material that is to be subjected to harsh processing treatment, such as for a retort packaging material, and variable information such as production date, manufacturer, product name, consumption date or location of production can be printed in the form of a laser printed image.

DESCRIPTION OF EMBODIMENTS

Examples of the multilayer structure of the multilayer lamination film for laser printing of the invention, and the package body and printing body using it, will now be explained in detail with reference to the accompanying drawings.

Figure 1:
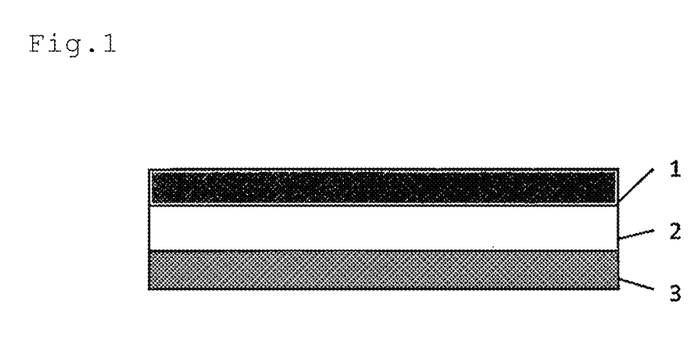
FIG. 1 is a schematic cross-sectional diagram showing an example of the multilayer structure of a multilayer lamination film for laser printing of the invention.

FIG. 1 is a schematic cross-sectional diagram showing an example of the multilayer structure of a multilayer lamination film for laser printing of the invention.

As shown in FIG. 1, the multilayer lamination film for laser printing of the invention has a basic construction comprising a base material layer 1, a printing layer 2 and a sealant layer 3. The printing layer 2 is a layer having an ink composition that is printable by laser light, printed on the entirety or a portion of the base material layer 1, the layer being carbonized by irradiation with laser light, to exhibit color.

Figure 2:
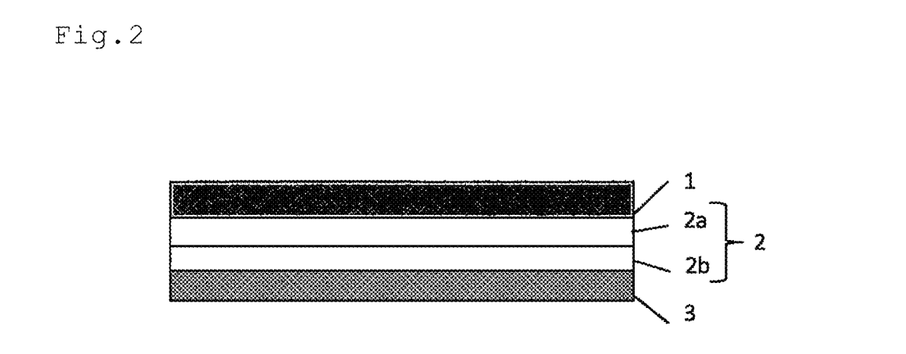
FIG. 2 is a schematic cross-sectional diagram showing another example of the multilayer structure of a multilayer lamination film for laser printing of the invention.

According to another aspect, as shown in FIG. 2, the printing layer 2 may have a laminated construction of two or more printing layers comprising the same or different ink compositions.

The ink composition forming the printing layer 2 in this case is a white ink including at least titanium oxide and a crystalline component-containing binder resin.

In order to further increase the visibility of the printed image, a ground layer printed with a white ink may also be provided between the sealant layer 3 and the printing layer 2. The white ink in the ground layer may either contain or not contain a crystalline component.

Figure 3:
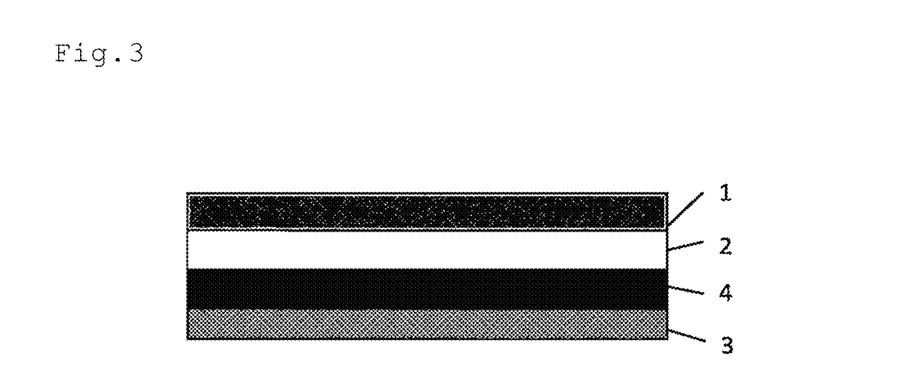
FIG. 3 is a schematic cross-sectional diagram showing another example of the multilayer structure of a multilayer lamination film for laser printing of the invention.

According to yet another aspect, as shown in FIG. 3, a barrier layer 4 may be provided between the sealant layer 3 and the printing layer 2. The barrier layer 4 in this case may be a gas barrier film, aluminum foil or stretched polyamide-based resin film, for example, which may be laminated by any desired lamination method such as dry lamination.

If necessary, the surface of each film may be subjected to optional surface treatment prior to lamination. The surface treatment may be pretreatment such as, for example, corona discharge treatment, ozone treatment, cold plasma treatment using oxygen gas or nitrogen gas, glow discharge treatment or oxidizing treatment using a chemical agent.

In addition, a primer coating agent layer, undercoat agent layer or anchor coating agent layer may also be provided between the printing layer and a barrier layer or sealant layer.

Figure 4:
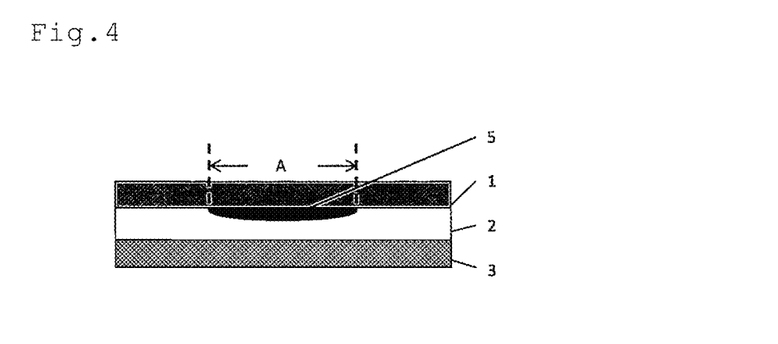
FIG. 4 is a schematic cross-sectional diagram showing an example of the laminar structure of a printing body having a laser printed image formed by irradiation of laser light on the multilayer lamination film for laser printing of the invention shown in FIG. 1.

As shown in FIG. 4, the printing body of the invention is produced by irradiating a multilayer lamination film for laser printing of the invention with a YAG laser, $YVO_4$ laser or fiber laser from the base material layer side, and it has a printed section on the surface of the printing layer where the carbonized ink composition has spread.

(Base Material Layer)

According to the invention, the base material layer used may be any desired resin film suited for the purpose of use and application.

Specifically, since it will serve as the basic material to form a surface protective layer after printing and to allow the laser printed image to be seen through it, it may be a resin film having excellent mechanical, physical and chemical strength, excellent pierce resistance and excellent heat resistance, moisture proofness and transparency.

Examples of such resin films that may be selected for the invention include various resin films made of polyolefin-based resins such as polyethylene resin and polypropylene resin, polyester resins such as fluorine resin and polyethylene terephthalate (PET), polyamide resins such as various nylon resins, and cellulose resins.

When one or more different resins are used for film formation, various compounding agents or additives may also be added for the purpose of, for example, improving or modifying the workability, heat resistance, weather resistance, mechanical properties, dimensional stability, oxidation resistance, slidability, releasability, flame retardance, microbial resistance, electrical properties, strength, lamination strength or other properties of the film, in which case they may be added as desired, from very trace amounts to several tens of percent, according to the purpose.

Examples of common additives to be used among those mentioned above include lubricants, crosslinking agents, antioxidants, ultraviolet absorbers, light stabilizers, fillers, reinforcing agents, antistatic agents, pigments and the like, as well as modifier resins.

If necessary, any of the surfaces may be subjected to optional surface treatment prior to lamination. The surface treatment may be pretreatment such as, for example, corona discharge treatment, ozone treatment, cold plasma treatment using oxygen gas or nitrogen gas, glow discharge treatment or oxidizing treatment using a chemical agent.

In addition, a primer coating agent layer, a undercoat agent layer or an anchor coating agent layer may also be provided between the printing layer and the base material layer.

The resin film used may be an unstretched film, or a stretched film obtained by stretching in a uniaxial direction or biaxial directions.

According to the invention, one or more different types of the different resin films mentioned above may be used, for a method of film formation with a single type of resin using an extrusion method, cast molding method, T-die method, cutting method, inflation method or other film-forming method, or a method of film formation with two or more different resins blended together before film formation, to produce films of the resins, and the stretched films that have been stretched in a uniaxial direction or biaxial directions utilizing a tenter system or tubular system may be used.

Also according to the invention, the thickness of the resin film may be any thickness that can maintain the necessary minimum strength and pierce resistance, but if it is too thick the cost will be disadvantageously increased, whereas if it is too thin the strength and pierce resistance will be undesirably reduced.

According to the invention, the thickness is preferably 10 to 100 μm and more preferably 10 to 50 μm, for the reason explained above.

According to the invention, the resin film used to form the base material layer is most preferably a PET film, a PET film with a transparent vapor deposition layer formed on it, or any of various nylon films. Such resin films are superior from the standpoint of stability, workability, cost, heat resistance and chemical resistance, especially for use as packaging materials, and when an ink composition to be used as the printing layer described below is laminated on them, it is possible to obtain satisfactory adhesiveness with the printing layer.

(Printing Layer)

According to the invention, the printing layer is a layer provided by laminating an ink composition that is printable by laser light onto a resin film that is to form the base material layer, by printing or coating.

The ink composition comprises a white ink containing titanium oxide (a white pigment) and a binder resin, and in that sense it is a common ink used as a printing ground layer.

According to the invention, a white ink employing a binder resin containing a crystalline component is particularly used among common white inks. Such an ink exhibits excellent properties as a printing ink for laser printing, i.e. high adhesiveness for the base material layer, while also tending to form distinct discolored regions by laser irradiation, along the boundary with the base material layer. In addition, when the laser energy is absorbed, thereby softening (melting) the crystalline component, damage to the base material layer is attenuated and generation of pinholes in the base material surface can be prevented.

White ink generally employs a binder resin consisting entirely of an amorphous resin, and usually in the endothermic curve by differential scanning calorimeter (DSC), only a gentle curve due to the glass transition of the amorphous resin is observed, with no observable endothermic peak. However, if the binder resin includes a sufficient amount of a crystalline resin so that an endothermic peak is observed, satisfactory properties are exhibited as a printing ink for laser printing.

For the purpose of the invention, binder resins include resins that are conventionally known as white ink binders, and specifically urethane resins, polyester resins, acrylic resins and cellulosic resins. These resins may be used alone or in combinations of two or more. Urethane acrylates including crystalline components are particularly preferred for use from the standpoint of forming clear printed images and exhibiting satisfactory adhesiveness with different base material films such as polyester films and polyamide films.

The amount of crystalline component in the binder resin need only be a sufficient amount to exhibit at least one endothermic peak in the endothermic curve during temperature increase, with measurement using a differential scanning calorimeter.

More specifically, a white ink that may be suitably used for the invention has one or more endothermic peaks in the range of 50 to 165° C. in the DSC endothermic curve.

The total crystal heat of melting ($\Delta Hmt$) for all of the endothermic peaks observed in the range of 50 to 165° C., when the crystal heat of melting ($\Delta Hm$ [units: mJ/mg]) has been measured at each peak temperature (Tm), is preferably 0.1 to 1000 mJ/mg and more preferably 1 to 100 mJ/mg. If the total crystal heat of melting ($\Delta Hmt$) is less than 0.1 mJ/mg, the amount of crystals in the white ink will be insufficient, the resulting printed image may have a narrow line width and weak color development, depending on the strength of lamination between the base material and the printing layer, potentially impairing the visibility. If the total crystal heat of melting ($\Delta Hmt$) is greater than 1000 mJ/mg, on the other hand, the amount of crystals will be too large, undesirably hardening the ink coating film.

According to the invention, the endothermic peak temperature (Tm) in differential scanning calorimetry is determined from an endothermic curve measured with temperature increase at a heating rate of 10° C./min, following the method of JIS-K7121 and 7122. The crystal heat of melting (ΔHm) is determined from the endothermic peak area.

The amount of crystalline component in the white ink can be appropriately adjusted by a person skilled in the art by selecting the type of starting monomer for the binder resin, according to the proportion of binder resin in the white ink, or by controlling the polymerization degree or amount of crystalline oligomer added, or by controlling heat release during the mixing step and carrying out heating and cooling in the polymerization step. For example, for a urethane acrylate that may be suitably used as a binder resin for the invention, a compound having molecular chains with low steric hindrance may be used for a portion of the starting material (alcohol, acrylate and isocyanate), to increase the proportion of the crystalline component.

According to the invention, the titanium oxide content in the white ink may be in the range of 5 to 90 mass %, and is preferably present at 20 to 50 mass %. If the titanium oxide content is less than 5 mass %, it will be difficult to form adequate discolored regions between the base material layer and printing layer by irradiation with laser light, making it difficult to obtain clear printing. If it is 90 mass % or greater, the titanium oxide content of the white ink will be too high, making it impossible to obtain adequate adhesiveness with the base material layer.

The binder resin content in the white ink is preferably in the range of 5 to 50 mass %. At less than 5 mass %, the proportion of crystalline component with respect to the total ink will be low, adequate adhesiveness with the base material will be reduced, and peeling will tend to occur between the base material layer and the printing layer by irradiation of laser light, making it difficult to obtain clear printing. If it is greater than 50 mass %, it will be difficult to form discolored regions, the metal oxide content of the white ink will be low, and it will be difficult to form adequate discolored regions by irradiation of laser light.

If necessary, optional additives may be added to the white ink. For example, lubricants, antiblocking agents, fillers, curing agents and the like may be added. Other additives that may be added include pigment dispersants, antifoaming agents, leveling agents, waxes, silane coupling agents, antiseptic agents, antioxidants, ultraviolet absorbers, rust-preventive agents, plasticizers, flame retardants and developing agents. These additives are used particularly for the purpose of improving the printing suitability and printing effect, and their types and usage amounts may be appropriately selected depending on the printing method, printing base material and printing conditions.

According to the invention, the ink composition used to form the printing layer may further contain if necessary, in addition to the white ink, a coloring ink comprising a binder resin and a coloring material that exhibits color upon irradiation with laser light.

Such binder resins include conventionally known resins, and specifically urethane resins, polyester resins, acrylic resins and cellulosic resins.

Coloring materials include pigments, dyes, and inorganic compounds other than pigments. Specifically, there may be mentioned various organic pigments, inorganic pigments such as diatomaceous earth, talc and clay, leuco dyes, simple metals such as bismuth, iron, zinc, antimony, tin, nickel, copper and molybdenum, as well as their metal salts, metal hydroxides and metal oxides. From the viewpoint of hot water resistance it is preferred to use an inorganic compound, considering that the purpose is for a laminated film.

Bismuth-based compounds, for example, bismuth oxide, bismuth nitrate-based compounds such as bismuth nitrate and bismuth oxynitrate, bismuth halide-based compounds such as bismuth chloride, and bismuth oxychloride, bismuth sulfate, bismuth acetate, bismuth citrate, bismuth hydroxide, bismuth titanate or bismuth subcarbonate, are especially preferred as coloring materials that exhibit color by low output laser light. Particularly preferred for use among these are bismuth hydroxide, bismuth oxide, bismuth subcarbonate and bismuth nitrate.

Moreover, antimony-doped tin oxide has a pale color hue and exhibits satisfactory color development by irradiation with laser light, and is therefore suitable for use in combination with white inks.

The content of the coloring material in the coloring ink is 1 to 50 mass % and preferably 1 to 30 mass %. If the coloring material content is too low, it will not be possible to obtain a coloration-supplementing effect. If the content is too high, conversely, no improvement in visibility will be obtained commensurate with the increased amount of coloring material, and instead, undesirable cost increase and coloration of the printing layer itself will result.

The coloring ink may further include, in addition to the binder resin and coloring material, also one or more inorganic compounds in order to increase the efficiency of color development. Such inorganic compounds include metal oxides, such as titanium oxide, magnesium oxide, zinc oxide, aluminum oxide, silicon oxide, nickel oxide, tin oxide, neodymium oxide, mica, zeolite, kaolinite, copper-based compounds, molybdenum-based compounds, copper/molybdenum complex oxides, copper/tungsten compounds and metal salts.

Examples of copper-based compounds that may be suitably used include copper, copper oxide, copper halides, copper salts of organic acids such as formic acid, citric acid, salicylic acid, laurylic acid, oxalic acid and maleic acid, and copper phosphate, copper hydroxyphosphate, and the like.

Molybdenum-based compounds that may be suitably used include molybdenum, molybdenum dioxide, molybdenum trioxide, molybdenum chloride and metal molybdates (metals: K, Zn, Ca, Ni, bismuth, Mg, etc.).

Metal salts that may be used are salts of acids such as sulfuric acid, nitric acid, oxalic acid and carbonic acid, and metals such as barium, cobalt, magnesium, nickel and iron.

The content of such inorganic compounds in the coloring ink is preferably 5 to 65 wt %. Their effects cannot be obtained at lower than 5 wt %. A content of higher than 65 wt %, conversely, is not preferred because the increased amount of inorganic compounds will increase cost and lead to lower strength of the printing layer.

According to the invention, the printing layer may have a laminated construction with two or more printing layers comprising the same or different ink compositions.

The total thickness of the printing layer is preferably 1.5 to 4.5μ and more preferably 2.7 to 3.3μ, as the coating amount of the ink composition after drying. If the printing layer is thicker than this range, the film will tend to suffer damage by laser irradiation. If it is thinner, conversely, the printed image will tend to be indistinct.

The method of laminating the printing layer is not particularly restricted, and methods such as ink-jet, dipping, spin coating or printing may be used. According to the invention, a method of lamination by printing is preferred. For example, the production process can be simplified by solid printing over the entirety or a portion of the surface of the base material layer, as the printing ground layer.

(Sealant Layer)

According to the invention, the sealant layer is a layer comprising a thermoplastic resin that is commonly used as a sealant layer, or a layer comprising a film of the resin.

Specific compounds of such thermoplastic resins include resins such as polypropylene, polyethylene, ethylene-vinyl acetate copolymer, ionomer resins, ethylene-acrylic acid copolymer, ethylene-ethyl acrylate copolymer and ethylene-methacrylic acid copolymer, used either alone or in mixtures of two or more. The thermoplastic resin forming the sealant layer may have various additives added, such as lubricants, fillers, heat stabilizers, antioxidants, ultraviolet absorbers, antistatic agents, flame retardants or coloring agents.

For use of the film as a packaging material, since it will serve as the innermost layer that is to contact with the contents it is preferred to use a polyolefin such as polyethylene or polypropylene.

The layer thickness of the sealant layer may be set as appropriate for the purpose of use of the multilayer lamination film for laser printing, but it is preferably 3 to 100 µm and more preferably 5 to 80 µm.

If necessary, a primer coating agent layer, undercoat agent layer or anchor coating agent layer, for example, may also be provided between the printing layer and the sealant layer. Surface treatment may optionally be carried out before lamination of the sealant layer. The surface treatment may be pretreatment such as, for example, corona discharge treatment, ozone treatment, cold plasma treatment using oxygen gas or nitrogen gas, glow discharge treatment or oxidizing treatment using a chemical agent.

The method of laminating the sealant layer is not particularly restricted, and the thermoplastic resin that is to form the sealant layer may be laminated by extrusion coating onto the printing layer. Alternatively, a film made of the thermoplastic resin may be laminated by a dry laminating or sandwich laminating method.

The bonding agent used for dry lamination may be a urethane-based bonding agent, vinyl-based bonding agent, acrylic bonding agent or epoxy-based bonding agent. An adhesive resin used for sandwich lamination may be any desired thermoplastic resin.

According to the invention, an optional functional layer such as a gas barrier film, aluminum foil or stretched polyamide-based resin film may be provided between the printing layer and the sealant layer using any desired lamination method such as dry lamination, depending on the purpose of use of the multilayer lamination film for laser printing.

(Printing by Laser Light)

According to the invention, the printing is preferably carried out using a YAG (yttrium (Y)/aluminum (A)/garnet (G)) laser beam (wavelength=1064 nm), a $YVO_4$ (yttrium vanadate) laser beam (wavelength=1064 nm) or a fiber laser light beam (wavelength=1090 nm, for example). These lasers have the property of penetrating through transparent bodies, and this property can be utilized to further minimize generation of smoke during printing and help modify its effects on the coloring concentration and on the film. As a result, even with laser printed images, it is possible to form extremely clear laser printed images free of holes.

Irradiation of these lasers from the base material layer side at low power can minimize damage to the film, while also gasifying and carbonizing the ink composition in the printing layer to form gaps between the base material layer and the printing layer, allowing a laser printed image to be efficiently formed on the printing layer surface.

According to the invention, the pulse conditions under which such printing is carried out may be pulse conditions with, for example, a $YVO_4$ laser machine (MD-V9600 by Keyence Corp.) at an average output of 0.8 to 5 W and more preferably 1.2 to 2 W, a Q switch frequency of 10 to 30 KHz, a scan speed of 300 to 4000 mm/s and more preferably 1500 to 4000 mm/s. Carrying out printing under these conditions will allow high-speed printing without opening holes in the multilayer lamination film for laser printing, and will yield clear printed images.

(Printing Body by Laser Light)

In the printing step on a multilayer lamination film for laser printing according to the invention, it is possible to carry out printing of clear printed images or thick, clear characters, for example, even if the laser is set to a low average output, or even if it is set to a rapid scan speed.

In the printing body of the invention, the diameter of the discolored region formed between the base material layer and the printing layer is preferably 40 µm to 1 mm, more preferably 400 µm to 1 mm and even more preferably 500 µm to 1 mm, with spot irradiation of the laser. The carbonized ink component in the discolored region spreads out, producing a clear printed image. If the diameter of the discolored region is smaller than this range, it may lead to loss of the printed image or creation of thin line widths, and reduced visibility. Conversely, it is also not preferably larger than this range because the image may break up.

According to the invention, laser printed images include, but are not limited to, characters, numerals, symbols and designs.

The printing body obtained by printing on the multilayer lamination film for laser printing of the invention may be applied to various packaging materials, labels, cards and the like. In particular, since the film of the invention has not only excellent laser printing suitability but also satisfactory interlayer lamination strength, it can be satisfactorily used even as a retort packaging material that is to be subjected to high-temperature, high-pressure treatment.

The printing layer in the multilayer lamination film for laser printing of the invention may comprise white ink that functions as a printing ground layer. Thus, an optional color printing layer may be provided on the printing layer as the ground layer, at a section where no laser printing is present.

(Package Body)

A package body comprising the multilayer lamination film for laser printing can be produced by using a layered material comprising the film, double-folding the layered material, doubling it with its sealant layer surfaces facing and heat sealing its edges to form a tubular package body, and then sealing the bottom sections, filling it with contents and sealing the top part.

A bag forming method may be one in which a layered material such as described above is bent or layered so that the inner layers face each other, and the surrounding edges are heat sealed in a heat sealing form such as a side seal, two-way seal, three-way seal, four-way seal, envelope seal, butt-seam seal (pillow seal), folded seal, flat-bottom seal, square-bottom seal or gauzette, to produce packaging laminated retort bags of various types. The method of heat sealing may be a known method such as bar sealing, revolving roll sealing, belt sealing, impulse sealing, high-frequency sealing or ultrasonic sealing.

EXAMPLES

The invention will now be explained in greater detail by the following examples, with the understanding that they are not intended to be limitative on the invention.

In these examples and comparative examples, the following white inks, coloring inks and curing agents were used in the amounts indicated.

<White Inks>

Figure 5:
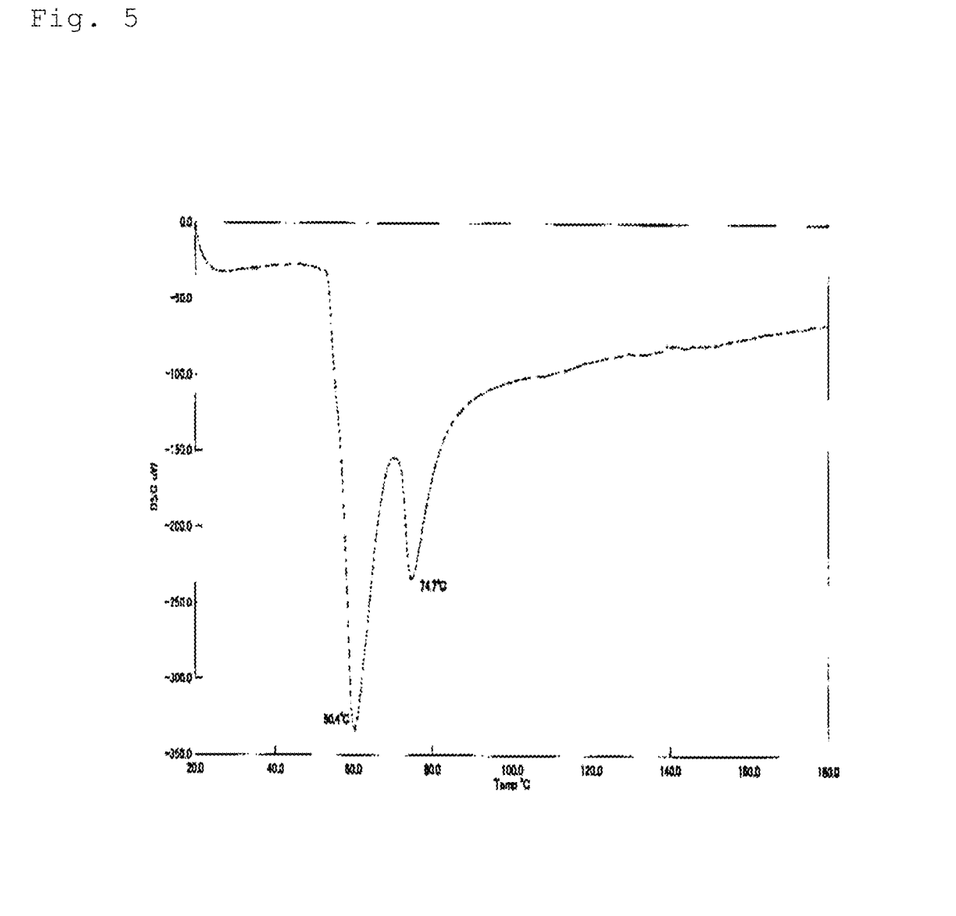
FIG. 5 is a graph of a DSC endothermic curve for white ink A used in the examples.

White ink A (Example): 40 mass % titanium oxide, 10 mass % crystalline urethane acrylate, 50 mass % mixing solvent. Two endothermic peaks from 55 to 80° C. (found at 60.4° C. and 74.7° C.) were exhibited in the DSC endothermic curve, with crystal heats of melting of 2.85 mJ/mg and 0.77 mJ/mg, respectively. A graph of the DSC endothermic curve is shown in FIG. 5.

Figure 6:
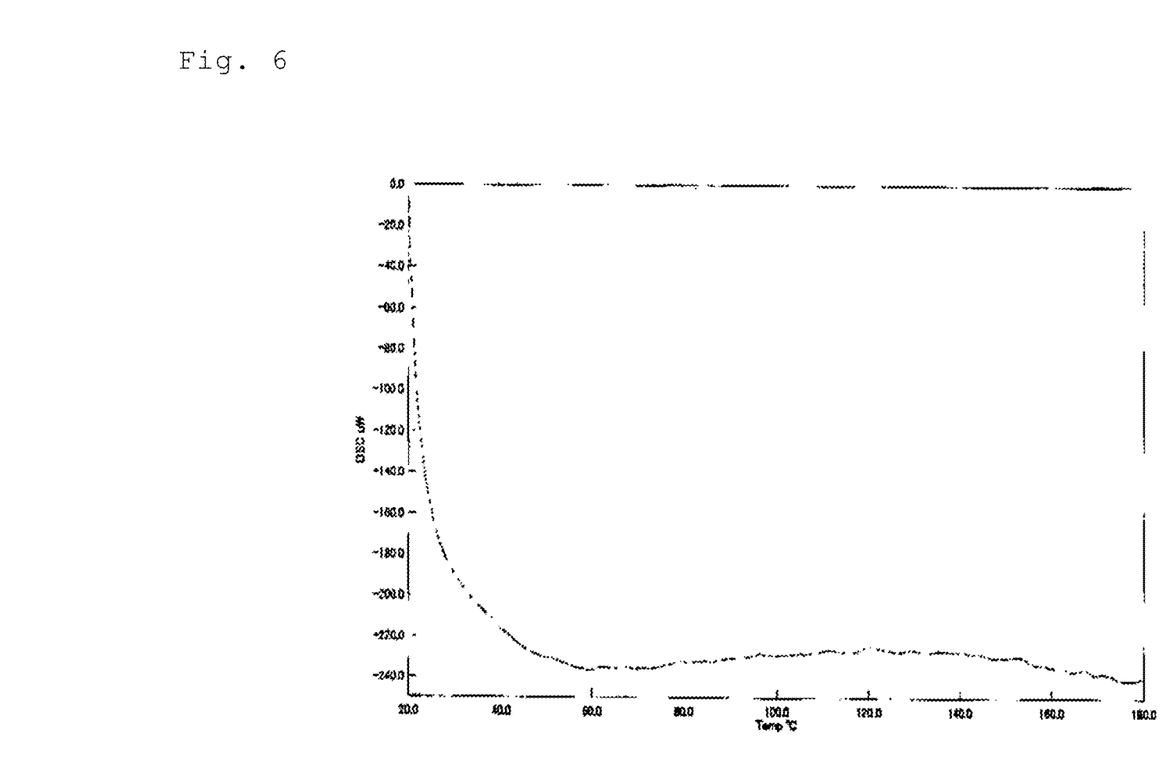
FIG. 6 is a graph of a DSC endothermic curve for white ink B used in the comparative examples.

White ink B (Comparative Example): 40 mass % titanium oxide, 10 mass % amorphous urethane acrylate, 50 mass % mixing solvent. In the DSC endothermic curve, only a gentle curve attributed to the glass transition of the amorphous resin was observed, with no endothermic peak. A graph of the DSC endothermic curve is shown in FIG. 6.

White ink C (Comparative Example): 50 mass % titanium oxide, 10 mass % amorphous urethane acrylate, 40 mass % mixing solvent. In the DSC endothermic curve, only a gentle curve attributed to the glass transition of the amorphous resin was observed, with no endothermic peak.

Incidentally, the mixing solvent used was methyl ethyl ketone:n-propyl acetate:isopropyl alcohol=3:5:2 (mass ratio).

<Coloring Ink>

Coloring ink A: Containing 5 mass % bismuth oxide and 15 mass % titanium oxide in a urethane-based binder resin.

Coloring ink B: Containing 10 mass % antimony-doped tin oxide in a urethane-based binder resin.

<Curing Agent>

Curing agent: Isocyanate-based curing agent

Example 1

A gravure printer was used to coat the ink composition (white ink A) onto the corona-treated side of a stretched nylon film with a thickness of 15 μm, to a (dry) coated thickness of 3 μm, forming a printing layer.

Next, a linear low-density polyethylene film with a thickness of 60 μm was dry laminated onto the printing layer via a two-pack curable urethane bonding agent ((dry) coating amount: 3 g/m$^2$) to form a sealant layer, to obtain a multilayer lamination film for laser printing of the invention. The multilayer structure of the laminated film was: base material layer (stretched nylon film)/printing layer/bonding agent/sealant layer (linear low-density polyethylene film).

Example 2

A multilayer lamination film for laser printing of the invention was obtained in the same manner as Example 1, except that for the ink composition, 3 parts by mass of the curing agent was blended with respect to 100 parts by mass of white ink A.

Example 3

A gravure printer was used to coat the ink composition (white ink A) onto the corona-treated side of a stretched nylon film with a thickness of 15 μm, to a (dry) coated thickness of 1.5 μm, forming a printing layer, and then white ink A was further coated to a (dry) coated thickness of 1.5 μm to form a ground layer.

Next, a linear low-density polyethylene film with a thickness of 60 μm was dry laminated onto the ground layer via a two-pack curable urethane bonding agent ((dry) coating amount: 3 g/m$^2$) to form a sealant layer, to obtain a multilayer lamination film for laser printing of the invention.

Example 4

A multilayer lamination film for laser printing of the invention was obtained in the same manner as Example 3, except that for the ink composition, 3 parts by mass of the curing agent was blended with respect to 100 parts by mass of white ink A.

Example 5

A multilayer lamination film for laser printing of the invention was obtained in the same manner as Example 3, except that for the ink composition, 5 parts by mass of coloring ink A was blended with respect to 95 parts by mass of white ink A.

Example 6

A multilayer lamination film for laser printing of the invention was obtained in the same manner as Example 3, except that for the ink composition, 5 parts by mass of coloring ink A and 3 parts by mass of the curing agent were blended with respect to 95 parts by mass of white ink A.

Example 7

A multilayer lamination film for laser printing of the invention was obtained in the same manner as Example 3, except that for the ink composition, 20 parts by mass of coloring ink A was blended with respect to 80 parts by mass of white ink A.

Example 8

A multilayer lamination film for laser printing of the invention was obtained in the same manner as Example 3, except that for the ink composition, 20 parts by mass of coloring ink A and 3 parts by mass of the curing agent were blended with respect to 80 parts by mass of white ink A.

Example 9

A multilayer lamination film for laser printing of the invention was obtained in the same manner as Example 3, except that for the ink composition, 5 parts by mass of coloring ink B was blended with respect to 95 parts by mass of white ink A.

Example 10

A multilayer lamination film for laser printing of the invention was obtained in the same manner as Example 3, except that for the ink composition, 5 parts by mass of coloring ink B and 3 parts by mass of the curing agent were blended with respect to 95 parts by mass of white ink A.

Example 11

A multilayer lamination film for laser printing of the invention was obtained in the same manner as Example 3, except that for the ink composition, 20 parts by mass of coloring ink B was blended with respect to 80 parts by mass of white ink A.

Example 12

A multilayer lamination film for laser printing of the invention was obtained in the same manner as Example 3, except that for the ink composition, 20 parts by mass of coloring ink B and 3 parts by mass of the curing agent were blended with respect to 80 parts by mass of white ink A.

Examples 13 to 24

A multilayer lamination film for laser printing of the invention was produced in the same manner as Examples 1 to 12, except that a 12 μm-thick biaxial stretched PET film was used as the base material layer.

Examples 25 and 26

Using a 12 μm-thick biaxial stretched PET film as the base material layer, an ink composition was coated on the corona-treated side thereof with a gravure printer in the same manner as Examples 1 and 2 to form printing layers.

Next, a 7 μm-thick aluminum foil (barrier layer) and a 70 μm-thick unstretched polypropylene film (sealant layer) were laminated in that order on the printing layer via a two-pack curable urethane bonding agent ((dry) coating amount: 3 g/m$^2$), to obtain a multilayer lamination film for laser printing of the invention.

The multilayer structure of the laminated film was: base material layer (PET film)/printing layer/bonding agent/barrier layer (aluminum foil)/sealant layer (unstretched polypropylene film).

Examples 27 to 36

Using a 12 μm-thick biaxial stretched PET film as the base material layer, an ink composition and white ink A were coated on the corona-treated side thereof with a gravure printer in the same manner as Examples 3 to 12, to form printing layers and ground layers.

Next, a 7 μm-thick aluminum foil (barrier layer) and a 70 μm-thick unstretched polypropylene film (sealant layer) were laminated in that order on the ground layer via a two-pack curable urethane bonding agent ((dry) coating amount: 3 g/m$^2$), to obtain a multilayer lamination film for laser printing of the invention.

The multilayer structure of the laminated film was: base material layer (PET film)/printing layer/ground layer/bonding agent/barrier layer (aluminum foil)/sealant layer (unstretched polypropylene film).

Comparative Examples 1 to 6

Multilayer lamination films for laser printing were obtained in the same manner as Examples 1, 2, 13, 14, 25 and 26, except that white ink B was used for the ink composition.

Comparative Examples 7 to 12

Multilayer lamination films for laser printing were obtained in the same manner as Examples 1, 2, 13, 14, 25 and 26, except that white ink C was used for the ink composition.

Evaluation

The multilayer laminated films obtained in Examples 1 to 36 and Comparative Examples 1 to 12 were evaluated in terms of lamination strength, printed line visibility, pinhole resistance and retort suitability, by the following tests.
<Lamination Strength>
The lamination strength between the base material layer and printing layer was measured using a tensile tester (TENSILON) according to JIS K 6854, with a pull rate of 50 mm/min, a 90° direction and a sample width of 15 mm.
<Printed Line Visibility>
Each multilayer laminated film was irradiated with a fiber laser beam (laser power: 30% and 60%) from the base material layer side under the conditions described below, forming a laser printed line to obtain a printing body. The colored line width and coloration concentration of the obtained printed line were observed.
(Fiber Laser Irradiation Conditions)
Examples 1 to 12, and Comparative Examples 1 to 2 and 7 to 8: (stretched nylon film as base material): Fiber laser machine (product of Panasonic Industrial Devices SUNX, LP-Z250, wavelength: 1060 nm), scan speed: 2000 mm/min, printing pulse cycle 40 μs
Examples 13 to 36, and Comparative Examples 3 to 6 and 9 to 12: (PET film as base material): Fiber laser machine (product of Panasonic Industrial Devices SUNX, LP-Z250, wavelength: 1060 nm), scan speed: 9000 mm/min, printing pulse cycle 20 μs
<Pinhole Resistance>
For the multilayer laminated films of Examples 26, 28, 30, 32, 34 and 36 and Comparative Examples 6 and 12, AGE-LESS seal check solution was spray coated onto the printing surface that had been printed with a laser power of 30% using the aforementioned fiber laser, and the presence or absence of infiltration of the solution into the printed sections was examined after wiping the staining solution off the surface.
<Retort Suitability>
Two multilayer laminated films each were prepared for Examples 26, 28, 30, 32, 34 and 36 and Comparative Examples 6 and 12, and after layering the sealant layers together to form a bag, the pouch surface was irradiated with laser light using the aforementioned fiber laser with a laser power 30%, to form a laser printed line. After filling it with water, the pouch was subjected to retort heat treatment at 121° C. for 30 minutes. The outer appearance of the pouch after heat treatment was observed for lack of lifting of the film due to interlayer separation at the printed section and its periphery. Also, a 15 mm-wide test strip was cut out from the pouch after heat treatment, and the lamination strength between the base material layer and the printing layer was measured in the same manner as described above.

The results are shown below in Tables 1 and 2.

[Table 1]

TABLE 1

| | Evaluation results | | |
|---|---|---|---|
| | Lamination strength | Visibility | |
| | [N/15 mm] | 30% Laser power | 60% Laser power |
| Example 1 | 1.0 | G | G |
| Example 2 | 1.0 | G | G |
| Example 3 | 1.8 | G | G |

TABLE 1-continued

| | Evaluation results | | |
|---|---|---|---|
| | Lamination strength | Visibility | |
| | [N/15 mm] | 30% Laser power | 60% Laser power |
| Example 4 | 2.0 | G | G |
| Example 5 | 1.7 | VG | VG |
| Example 6 | 1.7 | VG | VG |
| Example 7 | 1.8 | VG | VG |
| Example 8 | 2.2 | VG | VG |
| Example 9 | 1.6 | VG | VG |
| Example 10 | 1.7 | VG | VG |
| Example 11 | 1.3 | VG | VG |
| Example 12 | 1.5 | VG | VG |
| Example 13 | 1.4 | G | G |
| Example 14 | 1.5 | G | G |
| Example 15 | 1.8 | G | G |
| Example 16 | 1.9 | G | G |
| Example 17 | 1.8 | VG | VG |
| Example 18 | 1.8 | VG | VG |
| Example 19 | 1.8 | VG | VG |
| Example 20 | 1.9 | VG | VG |
| Example 21 | 1.8 | VG | VG |
| Example 22 | 1.9 | VG | VG |
| Example 23 | 1.8 | VG | VG |
| Example 24 | 1.7 | VG | VG |
| Example 25 | 1.5 | G | G |
| Example 26 | 1.6 | G | G |
| Example 27 | 1.8 | G | G |
| Example 28 | 2.0 | G | G |
| Example 29 | 1.8 | VG | VG |
| Example 30 | 1.8 | VG | VG |
| Example 31 | 2.0 | VG | VG |
| Example 32 | 2.1 | VG | VG |
| Example 33 | 1.8 | VG | VG |
| Example 34 | 1.9 | VG | VG |
| Example 35 | 1.7 | VG | VG |
| Example 36 | 1.8 | VG | VG |
| Comp. Example 1 | 1.5 | P | P |
| Comp. Example 2 | 1.5 | P | P |
| Comp. Example 3 | 1.4 | P | P |
| Comp. Example 4 | 1.5 | P | P |
| Comp. Example 5 | 1.6 | P | P |
| Comp. Example 6 | 1.6 | P | P |
| Comp. Example 7 | 0.3 | G | Lifting around printed section periphery |
| Comp. Example 8 | 0.4 | G | Lifting around printed section periphery |
| Comp. Example 9 | 0.4 | G | Lifting around printed section periphery |
| Comp. Example 10 | 0.4 | G | Lifting around printed section periphery |
| Comp. Example 11 | 0.8 | P | P |
| Comp. Example 12 | 0.8 | P | P |

G: Colored line width ≥0.1 mm and ≤0.5 mm, dense printed color, satisfactory visibility
VG: Colored line width >0.5 mm, dense printed color, excellent visibility
P: Colored line width <0.1 mm, faint printed color, poor visibility

TABLE 2

| | Evaluation results | | |
|---|---|---|---|
| | | Retort suitability | |
| | Pinholes | Lamination strength [N/15 mm] | Lifting occurred after retort treatment |
| Example 26 | Absent | 1.4 | No |
| Example 28 | Absent | 1.8 | No |
| Example 30 | Absent | 1.7 | No |
| Example 32 | Absent | 2.0 | No |
| Example 34 | Absent | 1.8 | No |
| Example 36 | Absent | 1.7 | No |
| Comp. Example 6 | Present | 1.4 | Yes |
| Comp. Example 12 | Absent | 0.7 | No |

The multilayer laminated films of the Examples had thick, clear printed images formed with both 30% and 60% laser power. In addition, no damage occurred in the base material films by laser irradiation, and no pinholes were found to be generated. Moreover, sufficient lamination strength was maintained even after retort treatment, and no lifting or interlayer separation of the films was seen at the printed sections or their periphery.

In contrast, the multilayer laminated films of the comparative examples either had thin printing concentration or narrow line widths, or exhibited lifting around the printing section periphery, impairing the visibility. In some cases, interlayer separation between the base material layer and the aluminum foil was observed to occur by retort treatment, due to insufficient lamination strength.

REFERENCE SIGNS LIST

1. Base material layer
2, 2a, 2b. Printing layer
3. Sealant layer
4. Barrier layer
5. Printed section
A. Diameter of discolored region

The invention claimed is:
1. A multilayer lamination film for laser printing comprising at least a base material layer, a printing layer and a sealant layer, wherein
the printing layer is a layer made of an ink composition that is printable by laser light,
the ink composition comprises a white ink including at least titanium oxide and a binder resin,
the binder resin comprises at least one selected from the group consisting of urethane resin, polyester resin, acrylic resin, cellulosic resin, and combinations thereof,
the white ink has one or more endothermic peaks in the range of 50 to 165° C. in a differential scanning calorimetry endothermic curve,
the binder resin contains a crystalline component at one or more of said endothermic peaks, and
a total crystal heat of melting for all of the endothermic peaks observed in the range of 50 to 165° C. that is a sum of a crystal heat of melting measured at each temperature having one of said one or more endothermic peaks is 0.1 to 1000 mJ/mg, wherein the endothermic peak temperature in differential scanning calorimetry is determined from an endothermic curve measured with temperature increase at a heating rate of 10° C./min according to the method of JIS-K7121 and 7122.

2. The multilayer lamination film for laser printing according to claim 1, wherein the binder resin includes a urethane resin, and the urethane resin is a urethane acrylate including a crystalline component.

3. The multilayer lamination film for laser printing according to claim 1, wherein the ink composition further includes a coloring ink in addition to the white ink, and the coloring ink includes a coloring material that develops color by irradiation with laser light, and a coloring ink binder resin.

4. The multilayer lamination film for laser printing according to claim 3, wherein the coloring material includes a bismuth-based compound.

5. The multilayer lamination film for laser printing according to claim 4, wherein the bismuth-based compound is one or more compounds selected from the group consisting of bismuth hydroxide, bismuth oxide, bismuth subcarbonate and bismuth nitrate.

6. The multilayer lamination film for laser printing according to claim 3, wherein the coloring ink includes one or more compounds selected from the group consisting of metal oxides and complex oxides.

7. The multilayer lamination film for laser printing according to claim 3, wherein the coloring ink includes one or more compounds selected from the group consisting of copper-based compounds and molybdenum-based compounds.

8. The multilayer lamination film for laser printing according claim 3, wherein the coloring material includes antimony-doped tin oxide.

* * * * *